March 1, 1966   S. W. PETREY   3,237,332
PICTURE DISPLAY MEANS

Filed March 3, 1964   2 Sheets-Sheet 1

INVENTOR.
Sanders W. Petrey

March 1, 1966  S. W. PETREY  3,237,332
PICTURE DISPLAY MEANS

Filed March 3, 1964  2 Sheets-Sheet 2

INVENTOR.
Sanders W. Petrey

United States Patent Office 3,237,332
Patented Mar. 1, 1966

3,237,332
PICTURE DISPLAY MEANS
Sanders W. Petrey, 203½ High St., Hazard, Ky.
Filed Mar. 3, 1964, Ser. No. 349,106
1 Claim. (Cl. 40—152)

This invention relates to the pictorial arts and particularly to a frame construction for mounting a picture in a manner producing the visual effect of a three-dimensional object.

Various methods are known of producing illusions of this type. For example, it has been endeavored to create an illusion of depth simply by mounting a picture upon a lens-shaped backing. And there are a number of known methods which rely upon a stereopticon effect, whereby two images of a given object each image being photographed from a slightly different angle, are presented respectively to the right and the left eye of the observer. Devices of this latter type require the observer to distinguish the actual separable nature of the images without, however, consciously perceiving them as a double image. Usually this stereopticon method requires the aid of differentiating spectacles or other optical-mechanical means.

Such prior methods have either proven to be unsatisfactory in generating a satisfactorily realistic effect or else require resort to photographic and viewing apparatus that is complicated, inconvenient and expensive.

In Patent No. 2,971,282, issued February 14, 1961, I have described and claimed a picture frame in which a picture may be mounted in a described manner and which produces a combination that gives rise to a very effective appearance of depth which seems to follow from the viewer's unconscious identification of the curved surface with the normal appearance of a solid body. According to this patent a quadrangular picture frame is constructed which has sides, including the top and bottom, of substantial width, the whole frame narrowing or converging toward the front. The front of the frame is covered with a sheet of glass or other transparent material which curves at the top in a manner so as to present a convex surface toward the front. Further, the top member of the quadrangular frame is cut so as to provide a curved forward edge to receive the upper edge of the transparent sheet. Within this frame according to the patent description, there is mounted a picture such as a studio portrait, the plane of the picture being dished or curved in from its normal flat configuration so as to present a cylindrical concave surface toward the front side of the frame.

Whereas technically the combination described in Patent No. 2,971,282 is highly effective, the practical matter of manufacturing the frame and window presents some special difficulties. Accordingly, I have given consideration to the possibility of a simpler design which, although it might be expected to be less effective as far as the three-dimensional effect or illusion was concerned, would lend itself more readily to manufacturing facilities. In short, would be simpler and less expensive to produce.

Accordingly, attention was directed toward the possibility of eliminating the curvature of the front edge of the upper frame member, and dispensing with the curvature on the part of the transparent pane or window member.

According to the present invention a frame is constructed which, in certain respects, is comparable to the frame described in Patent No. 2,971,282, but in others differs radically therefrom. According to the present concept, the top member of the quadrangular frame is not cut to form a recess, but itself, and like the other frame members, is quadrangular, and presents a straight edge to the front. Moreover, the curved window sheet is dispensed with, and there is employed in place thereof an ordinary flat transparent sheet of glass or plastic. Behind the window member the picture is mounted, curved in the form of a section of a cylinder.

The object of imparting most effective three-dimensional appearance, it was found, could be achieved, if the upper and lower edges of the window were treated to render them relatively opaque. The opaque area may be created by any method desired. For example, the area may be coated, impregnated, tinted, sprayed, covered with a pigmentary material or strip of sheet material itself opaque or, as will be explained, relatively opaque. Whereas the relatively opaque or dark area may be of uniform color, is preferable that the density of color be graduated, the darker portion of the area being that close to the frame member, i.e., bordering the outer edges of the window member, the color density from thence decreasing toward the center of the window. In this view there normally will be no sharp line of demarcation between the dark area and the remainder of the windown member, but the opaque and transparent areas will merge imperceptibly. Otherwise stated, the light transmission through the window member which for the greater part of the area thereof normally will be of substantially complete transparency, will grade off approaching the upper and lower edges of the window reaching minimum transparency at said edges.

The darkened area or areas of the window constitute at least one and preferably two relatively narrow bands of graduated width. In the hereinafter described example, bands, both top and bottom, are widest at the sides and narrowest at the middle. Corresponding to the curvature of the basic picture, the narrowing of the bands toward the center is smooth and continuous, and thus constitutes a curved border. As will hereinafter be made clear, the opaque areas of the window obscure the upper and lower edges of the picture thereby contributing to the achievement of the ultimate illusion.

The picture, such as a studio portrait, of fitting proportions is mounted in the frame in a manner to compress the picture laterally whereby it takes the shape of a section of a cylinder, presenting a concave surface in the direction of the viewer.

Whereas the novel features which particularly characterize the present invention will be pointed out in the subjoined claims, in order that the invention may be better understood together with its advantages and objects, the following description is provided of specific embodiments of the invention.

Figure 1:
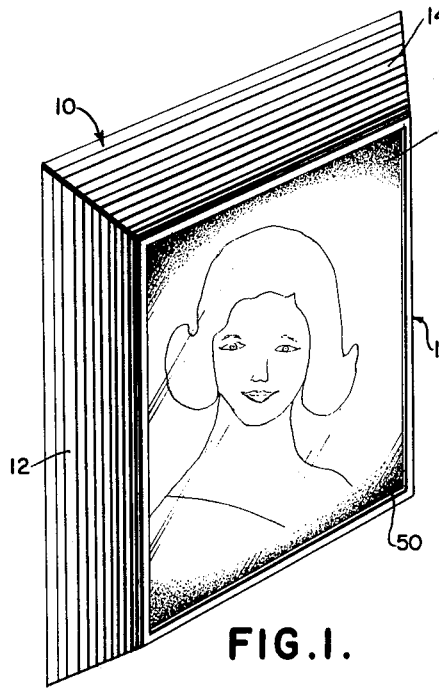
FIG. 1 is a perspective view of a complete assembled picture display according to the present invention.
Figure 2:
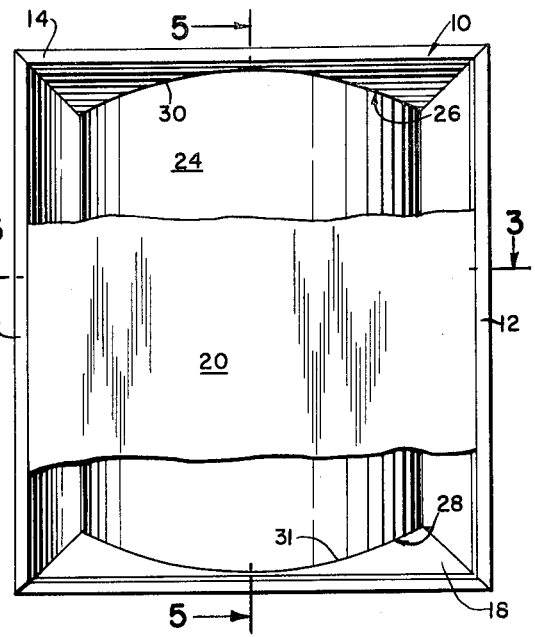
FIG. 2 is a view in elevation showing the interior of the assembly of FIG. 1 as viewed from the rear.
Figure 3:
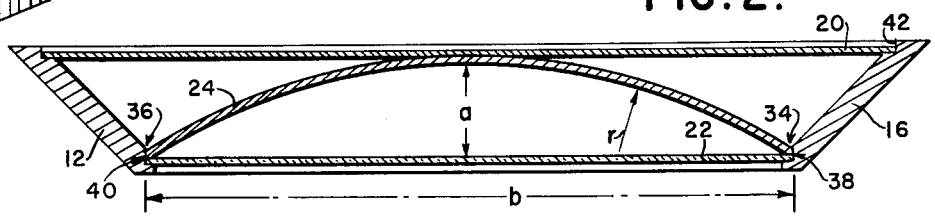
FIG. 3 is an enlarged cross section view of the assembly taken along the line 3—3 of FIG. 2.
Figure 4:
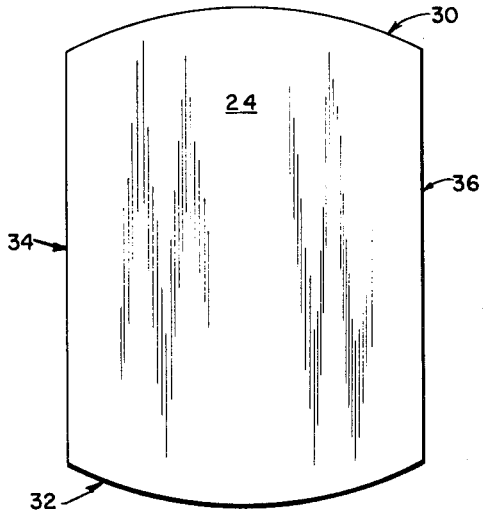
FIG. 4 is a view of the picture sheet prior to insertion in the frame according to FIGS. 1, 2 and 3.

Referring particularly to FIGS. 1 and 2, the construction shown involves a frame member 10, within which is mounted a picture 24, the latter basically consisting of a normally flat portrait, which however is mounted in the frame 10 so as to be laterally compressed thereby assuming the shape of a section of a cylinder. The front of the frame is covered by a window member 22, and the back is covered by a backing member, sheet 20. The whole assembly thus constitutes a relatively shallow rectangular box composed of sides 12, 14, 16 and 18, these when the picture is upright as shown constituting the left, top, right and bottom sides respectively. Grooves 26 and 28 (FIG. 6) may be cut in top and bottom frame members 14 and 18 to receive the top edge 30 and bottom edge 32 of picture 24 (FIG. 4). In the embodiment illustrated the side edges 34 and 36 of the picture are set in rabbets 38 and 40, which latter may likewise accommodate the left and right edges of window 22 (FIG. 3). The edges of the window thus fit rabbets 38 and 40, and 44 and 46.

Figure 5:
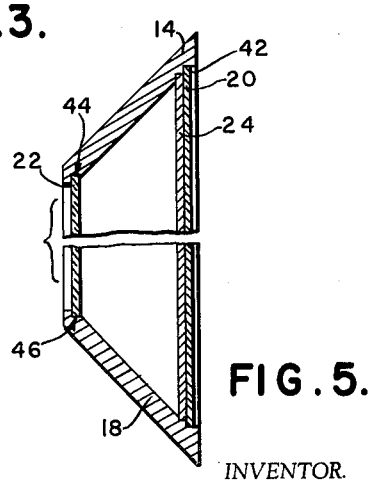
FIG. 5 is a vertical section, in part cut away, of the assembly taken along the line 5—5 of FIG. 2.

The backing member 30 is mounted in groove 42 which may be set in around the inner peripheral surface of the frame. The upper and lower edges of the window are receivable in grooves 44 and 46 respectively (FIG. 5) which, together with rabbets 38 and 40, constitute the periphery of the front opening which window 22 fits and fills.

The effect desired is best achieved when the curvature of the picture is maintained so as not to vary substantially from the relative dimensions hereinafter set forth. Specifically, if the width of the picture as mounted be designated as $b$ (FIG. 3), the radius of curvature shown as $r$ (FIG. 3) should not depart markedly from the length $b$. Assuming that the picture is to be fitted to a frame 16 inches in width (dimension $b$, FIG. 3), it is preferable that the picture be curved in an arc on the circumference of a circle which has a radius of approximately 15 to 17 inches. Other factors being equal, if a considerably lesser radius of curvature is imposed upon the picture sheet, or if on the other hand the radius $r$ is too large, the illusion may be diminished or lost or the appearance of the picture may be distorted or displeasing to the eye.

Figure 6:
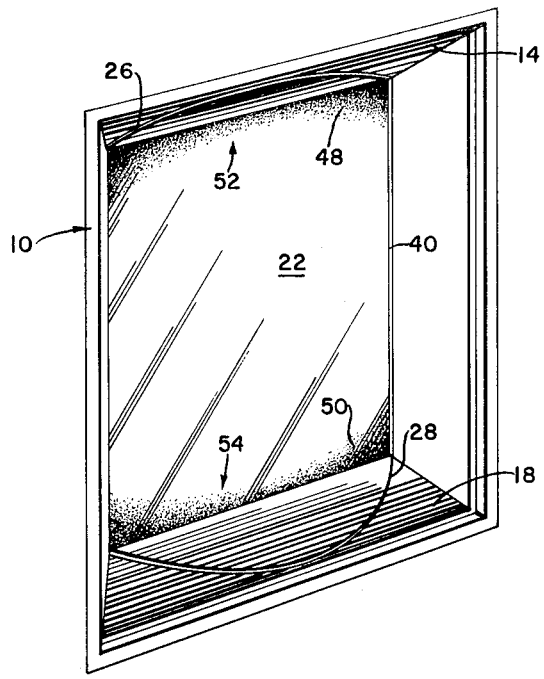
FIG. 6 is a perspective view of the interior from the back of the frame according to FIG. 1 with the backing sheet and picture omitted.
Figure 8:
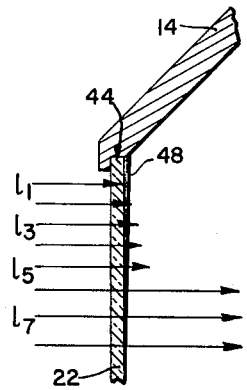
FIG. 8 is a view showing on enlarged scale certain details of FIG. 5.

The darkened portions of the window are shown in FIGS. 1, 6 and 8. Referring to FIGS. 1 and 6, it will be seen that these areas consist of relatively narrow zones 48 and 50. In this embodiment the width of each zone narrows to lesser width toward the middle, whereby the borders of the zones 52 and 54 toward the window center are concave. It will be understood that one effect of the dark zones will be to partly or wholly conceal from view the upper and lower edges of the picture as received in grooves 26 and 28.

Figure 7:
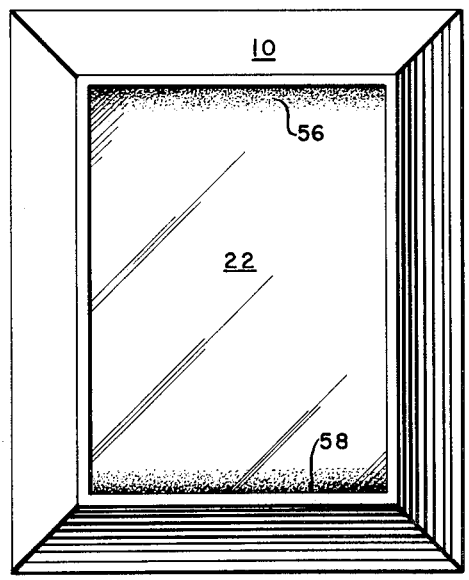
FIG. 7 is a view in elevation showing a modified form of the assembly according to the present invention.

FIG. 7 illustrates a frame assembly in all respects resembling that of FIGS. 1 to 6, except as to the dark zones. In FIG. 7 it will be seen that the dark zones 56 and 58 traverse the uppermost and lowermost areas of the window in bands of substantially constant width.

FIG. 8 illustrates in detail the preferred arrangement wherein the density of the dark zone decreases in a given direction. In this figure certain details are obviously disproportionately magnified for purposes of exposition. It is assumed moreover that the darkening is applied by a surface coating, preferably the underside, and that the depth of this coating thins and consequently fades in density toward the window center, where it may be taken to merge at border 52 imperceptibly with the transparent major area of the glass. Manifestly there are a number of variations on the means employed, half-tone inking, and tinting of the glass itself being among means available. This figure may be correlated with FIG. 5 of the drawings, wherefrom it may be taken that the upper edge of window 22 where it meets groove 44 in top member 14 is shown. It is further assumed that light represented by arrows $1_1$ to $1_7$ is entering in a direction from the left substantially normal to the surface of window 22. It being further assumed that zone 48 is fully opaque at the top, i.e., at the periphery of the window, then as light impinges at the point of arrow $1_1$ it will be absorbed. At point of arrow $1_3$ the dark $a$ zone is lightly lighter or more translucent and accordingly at that point light rays are going through. Progressing now to arrow $1_5$ maximum traverse of light occurs through the dark zone, and finally approaching the level of arrow $1_7$ virtually unhindered transparency obtains. It will be understood that this illustration of a zone of differential opacity is in accordance with applicant's preferred modification, but that this arrangement is applicable to either the top or the bottom zone or both, and pertains either to the modification of FIGS. 1 to 6 or to that of FIG. 7. Moreover, although light is shown as being received from the left in this figure, it will be understood that light at the same time is being reflected back from the picture in like manner through the dark zone.

Other means of practicing the present invention will follow from the present disclosure.

I claim:

In combination a frame for mounting pictures, said frame comprising a plurality of frame members, a picture-bearing member mounted in said frame, said frame inclosing a three-dimensional space, a transparent window covering the front opening of said space, the area of said window adjacent to at least one edge thereof being darkened to form a zone of relative opacity, said picture-bearing member being concave with respect to the front opening of said space and embracing substantially the entire lateral extent of the front opening of said frame, said zone varying in opacity, diminishing from the periphery toward the center of said window.

References Cited by the Examiner

UNITED STATES PATENTS

| | | | |
|---|---|---|---|
| 1,802,170 | 4/1931 | Colbert et al. | 40—152 |
| 2,961,789 | 11/1960 | Hughes | 40—152 |
| 2,971,282 | 2/1961 | Petrey | 40—152 |
| 3,041,762 | 7/1962 | Knox | 40—152 |

EUGENE R. CAPOZIO, *Primary Examiner.*

WENCESLAO J. CONTRERAS, *Assistant Examiner.*